United States Patent [19]

Ishiguro et al.

[11] 4,139,282
[45] Feb. 13, 1979

[54] DEVICE FOR INDICATING FADING OPERATION

[75] Inventors: Yasuo Ishiguro; Tomio Kurosu, both of Tokyo, Japan

[73] Assignee: Copal Company Limited, Tokyo, Japan

[21] Appl. No.: 797,745

[22] Filed: May 17, 1977

[30] Foreign Application Priority Data

May 17, 1976 [JP] Japan ................................ 51-55459

[51] Int. Cl.² ........................................... G03B 21/36
[52] U.S. Cl. ................................... 352/91 C; 352/141
[58] Field of Search ................... 352/91 C, 91 S, 141

[56] References Cited

U.S. PATENT DOCUMENTS 4,015,119  3/1977  Miyake ........................... 352/91 C

*Primary Examiner*—Russell E. Adams
*Attorney, Agent, or Firm*—Oblon, Fisher, Spivak, McClelland & Maier

[57] ABSTRACT

A device is provided for indicating fading operation in cinecamera. A control circuit receives the scene light indicating voltage and a manually adjusted output voltage for operating a diaphragm driving means to adjust the aperture to a proper value for the scene brightness an RC circuit is connected to the diaphragm control circuit which selectively applys either a constant charging or discharging voltage to the diaphragm control circuit, this causes the control circuit to drive the diaphragm to continuously vary the aperture for effecting the fading-out and the fading-in of the scene. A first comparator receives the output voltage of the RC circuit and the output voltage of the diaphragm control circuit and produces a signal when both voltages are coincident. A second comparator connected to the RC circuit produces a signal when the output voltage of the RC circuit reaches a constant charging an indicator receives the output signals of the first and the second comparator for indicating the completion of both fading-out and fading-in of the scene.

6 Claims, 8 Drawing Figures

DEVICE FOR INDICATING FADING OPERATION

BACKGROUND OF THE INVENTION

The present invention relates to a device for indicating fading operation in a cinecamera.

Heretofore, in a cinecamera in which a galvanometer or a voltmeter is used to drive the diaphragm of the objective lens of the cinecamera through a control circuit connected to the meter so as to achieve the proper exposure while the automatic fading operation is effected by controlling the current flowing through the meter, the condition of advance of the fading operation is visually confirmed by observing the indication of the aperture of the diaphragm if such is provided in the camera, or a device is provided which includes a light emitting diode adapted to be lighted upon completion of the stopping-down of the diaphragm or the completion of the fading out so as to indicate the completion of the fading-out.

However, such a prior art device for indicating fading operation is not yet satisfactory for permitting the operator to carry out correct fading operation without wasteful or premature manipulation of the camera by indicating clearly each steps of advance in the fading operation and the operator is at all times uneasy in operating the camera for the fading operation.

The object of the present invention is to provide a novel and useful device for indicating fading operation in a cinecamera which is simple in construction and inexpensive and easy to adjust and yet avoids the disadvantages of the prior art device for indicating fading operation in a cinecamera.

The above object is achieved in accordance with the present invention by the provision of a device for indicating fading operation in a cinecamera having a control circuit adapted to receive a controlled output voltage such as the scene light indicating voltage corresponding to the scene brightness and a manually adjusted output voltage and to drive a diaphragm driving means of the camera so as to adjust the diaphragm aperture to a value set by the controlled output voltage, a capacity-resistor circuit connected to the diaphragm control circuit and adapted to selectively apply constant charging voltage to the diaphragm control circuit and discharge the charged voltage at constant rate, thereby permitting the control circuit to drive the diaphragm driving means correspondingly to the selectively charged or discharged voltage so as to continuously vary the aperture of the diaphragm with the lapse of time for effecting the fading-out and the fading-in, the device being characterized by a first comparator adapted to receive the output voltage of the capacitor-resistor circuit and the output voltage of the diaphragm control circuit to issue a signal when both the output voltages are made coincident with each other, a second comparator connected to the capacitor-resistor circuit adapted to issue a signal when the output voltage of the capacitor-resistor circuit reaches a constant charging voltage corresponding to the completion of the fading-out, and indicating means adapted to receive the output signals of the first and second comparator and indicate at least the completion of the fading-out as well as the completion of the fading-in.

The controlled output voltage to be applied to the diaphragm control circuit may be a scene light indicating voltage supplied from a scene light indicating voltage generating circuit including a photoelectric element so that, in the normal operation of the camera, proper exposure is achieved by the device.

The indicating means may include a light emitting element so that the indication is visually indicated.

Also, the indicating means may include a flag member driven by an electromagnet either of which or the image of which is moved into or removed from the field of view of the finder of the cinecamera according to the condition of the fading operation.

BRIEF DESCRIPTION OF THE DRAWINGS

FIG. 1 is a diagram showing the conditions of the fading-out and the fading-in;

DETAILED DESCRIPTION OF THE PREFERRED EMBODIMENTS

Prior to the description of the present invention, the characteristic curves of a conventional fading device will be described with reference to FIG. 1.

Figure 1:
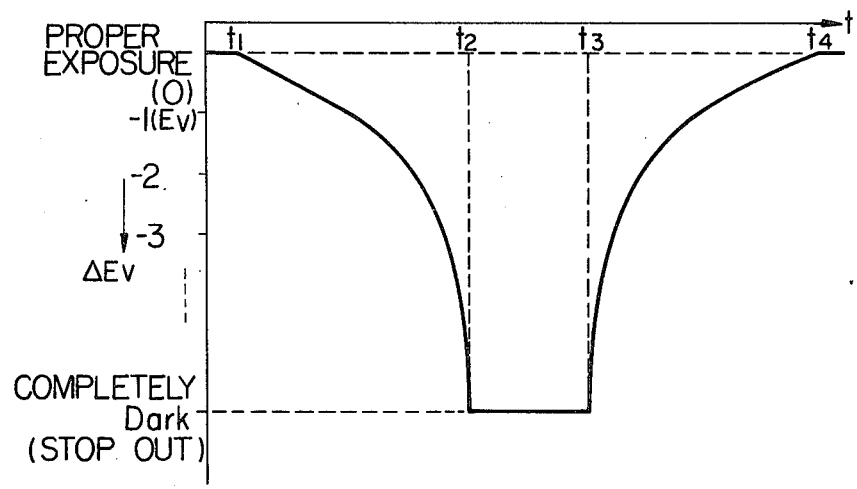

The ordinate of FIG. 1 shows the variation in the exposure from the proper exposure condition in terms of exposure value EV while the abscissa shows the lapse of time.

In a cinecamera having a conventional automatic fading device, a single fading button is provided for facilitating the manipulation of the camera so that the fading-in and the fading-out are effected by manipulating the single fading button. In such a type of the camera, the ordinary filming or shooting of a scene is effected when the fading button is not depressed during the operation of the camera and the fading-in is effected by depressing the fading button. After the lapse of a predetermined time period, the fading-out is completed. When the fading-in is to be effected, the fading button is depressed so as to stop-down the diaphragm aperture to the aperture corresponding to that corresponding to the completion of the fading-out and the fading button is freed simultaneously with the commencement of the shooting of the scene so as to commence the fading-in.

Two conditions exist which are very difficult to be grasped by the operator. This is, referring to FIG. 1, the point of time $t_2$ at which the fading-out is completed and the point of time $t_4$ at which the fading-in is completed, which time points $t_2$, $t_4$ are very difficult to be grasped by the operator, although the time point $t_1$ at which the fading-out is commenced and the time point $t_3$ at which the fading-in is commenced are clearly grasped because they are determined by the operator himself.

In the case of a camera having the diaphragm aperture indicating device described above, the time point $t_2$ at which the fading-out is completed can not be clearly grasped and, further, the time point $t_4$ at which the fading-in is completed can not be judged, because the scene brightness may vary momently.

In the case of a camera in which the time of completion of stopping-out is indicated by the illumination of the light emitting diode, the time of completion of the fading-in can not be judged although the time of completion of the fading-out can be grasped.

Therefore, in the case of the prior art camera, the operator might commence the fading-in before the completion of the fading-out by premature actuation of the fading-in during the advance of the fading-out or the operator might effect the fading-in after lapse of too long time period after the completion of the fading-out thereby wasting the time and the film.

The present invention insures that the conditions in the advance of the fading operation are clearly indicated thereby permitting the exact fading operation to be effected, while waste of film is positively avoided and the operator can freely manipulate the camera with ease avoiding the false functions due to chattering of switches in the device as is the case of using mechanical control.

In accordance with the present invention, the control circuit is made possible to indicate the time period in which the fading operation is being effected by the indicating means.

Preferred embodiments of the present invention will be described with reference to FIGS. 3 - 8 in connection with the fading circuit of the prior art shown in FIG. 2.

Figure 2:
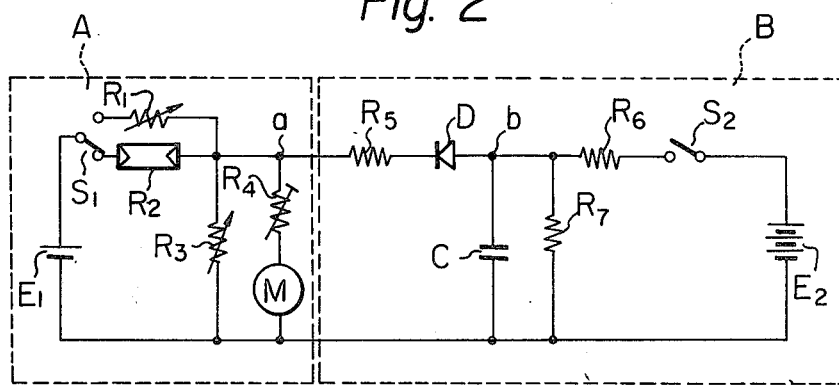
FIG. 2 is a diagram showing an example of the prior art circuit for the fading operation.

In FIG. 2 showing the prior art fading circuit, the diaphragm control circuit A comprises an electric source $E_1$, a manually adjustable resistor $R_1$ and a photoconductive element $R_2$ selectively connectable to one terminal of the electric source $E_1$ by a switch $S_1$, a variable resistor $R_3$ which can introduce informations relating to the film sensitivity and the film feeding speed and the like by adjusting the resistance value of the resistor $R_3$, a series circuit consisting of a resistor $R_4$ for introducing informations of the exposure factor and a meter M coupled with the diaphragm for controlling the aperture thereof, the series circuit being connected to the terminals of the electric source $E_1$ through the resistor $R_1$ or the photoelectric element $R_2$ depending upon the switching of the switch $S_1$, so that an output voltage relating to the scene brightness or the controlled voltage given by the divided voltage of the dividing voltage circuit consisting of the photoelectric element $R_2$ or the manually adjustable resistor $R_1$ the connection of which is selectively switched by the switch $S_1$ and the variable resistor $R_3$ is applied at a to the series circuit of the resistor $R_4$ and the meter M thereby driving the diaphragm by the meter M depending upon the voltage applied by the voltage appearing at a for achieving the proper exposure corresponding to the scene brightness as sensed by the photoelectric element $R_2$ or for the controlled aperture as given by the adjustment of the manually adjustable resistor $R_1$.

The fading circuit B comprises an electric source $E_2$, a series circuit consisting of a resistor $R_6$ and a resistor $R_7$ and connected between the terminals of the electric source $E_2$ through a switch $S_2$ so as to be selectively connected and disconnected from the electric source $E_2$, a capacitor C connected in parallel to the resistor $R_7$ so that a divided voltage given by the series connection of the resistors $R_6$ and $R_7$ is given at b to the capacitor c so as to be charged when the switch $S_2$ is closed, and a diode D connected between the points a, b through a resistor $R_5$ so that a current can flow from the point b to the point a through the diode D and the resistor $R_5$, the meter M and the capacitor C being connected at minus ends thereof opposite to the points a, b.

When the switch $S_2$ is opened, the fading circuit B is inoperative, and the diaphragm control circuit A operates to achieve the proper exposure or the controlled aperture of the diaphragm as described previously.

When the switch $S_2$ is closed, the capacitor C is charged by the divided voltage given by the resistor $R_7$ so that the voltage at b is raised. When the voltage at b is made higher than the voltage at a, a current will flow from the point b to the point a through the diode D and the resistor $R_5$ to raise the voltage correspondingly to the voltage at b, thereby actuating the meter M to stop down the aperture of the diaphragm for effecting the fading-out.

The resistance values of the resistors $R_6$, $R_7$ are so set in connection of the source voltage that the fading-out is completed when the voltage at b reaches the divided voltage given by the resistor $R_7$.

When the switch $S_2$ is opened after the completion of the fading-out, the electric charge stored in the capacitor C is discharged through the resistor $R_7$ so that the voltage at b is lowered and, hence, the voltage at a is lowered to open the aperture of the diaphragm by the actuation of the meter M to effect the fading-in. When the voltage at a reaches the divided voltage given by the resistor $R_3$, the proper exposure or the controlled aperture of the diaphragm is again restored by the photoelectric element $R_2$ or the manually adjustable resistor $R_1$ for completing the fading-in.

Figure 3:
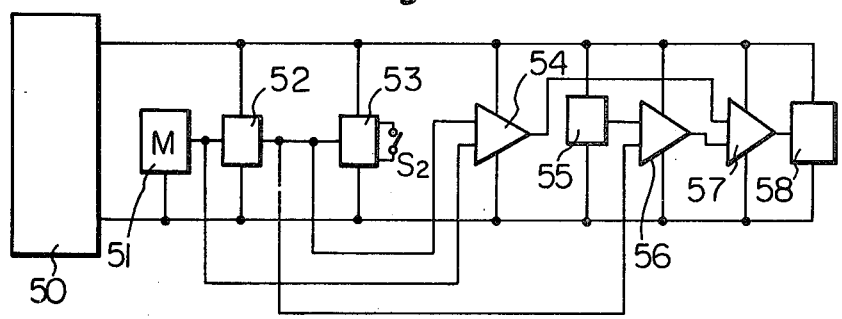
FIG. 3 is a diagram showing the basic circuit of the fading indicating circuit in accordance with the present invention.

FIG. 3 shows the basic circuit of the fading indicating circuit in accordance with the present invention.

The circuit comprises an electric source 50 and a diaphragm control circuit 52 energized by the electric source 50 and including a photoelectric element and/or a manually adjustable resistor for generating a scene light indicating voltage by means of the photoelectric element or an adjusted voltage by means of the manually adjustable resistor. The output of the control circuit 52 is applied to a meter 51 coupled with the diaphragm so as to drive the same thereby achieving the proper exposure or the controlled aperture of the diaphragm.

The fading indicating circuit further includes a capacitor-resistor circuit 53 selectively connectable to the fading indicating circuit by a switch $S_2$ for the fading operation. The capacitor-resistor circuit is adapted to additionally charge the diaphragm control circuit 52, when connected, so that the fading-out is effected, and the fading-in is effected by disconnecting the capacitor-resistor circuit 53 from the fading indicating circuit for allowing the discharge of the additional charge from the diaphragm control circuit. A first comparator 54 is adapted to receive the output of the diaphragm control circuit 52 to be given to the meter 51 as well as the output of the capacitor-resistor circuit 53 to be given to the diaphragm control circuit 52 so as to compare the both outputs received so that a signal is issued when the two voltages received by the first comparator 54 are made equal to each other. A second comparator 56 is adapted to receive the output of the capacitor-resistor circuit 53 as well as the output of a voltage generating circuit 55 which detects a predetermined high voltage of the capacitor-resistor circuit 53 corresponding to that at which the fading out is completed and issues the output so as to compare the both and issues a signal when the output of the capacitor-resistor circuit 53 reaches the predetermined high voltage. An indicating circuit driving circuit 57 is adapted to receive the outputs of the first and the second comparator 54 and 56 so as to indicate in various manners the time of commencement of the fading-out, the time required for the fading-out, the time of completion of the fading-out, the time interval between the completion of the fading-out and the commencement of the fading-in, the time of commencement of the fading-in, the time required for the fading-in and the time of completion of the fading-in by means of the indicating circuit 58 connected to the output of the driving circuit 57 as described hereinafter.

Figure 4:
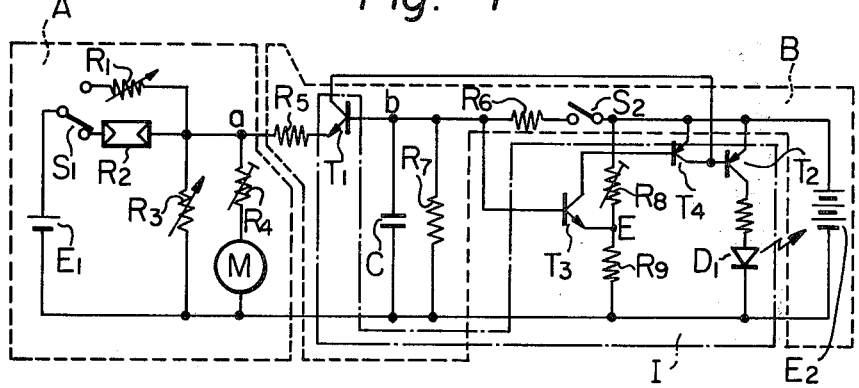
FIGS. 4 - 7 are diagrams showing various embodiments of the fading indicating circuits of the present invention.

FIG. 4 shows a first embodiment of the fading indicating device incorporating a fading indicating circuit I of the present invention to which the basic circuit shown in FIG. 3 is applied.

The diaphragm control circuit A and the fading circuit B in FIG. 4 are similar to those of the prior art shown in FIG. 2. The indicating circuit I comprises transistors $T_1$, $T_2$, $T_3$ and $T_4$, voltage dividing resistors $R_8$, $R_9$, and a light emitting diode $D_1$ connected as shown in FIG. 4 so that the light emitting diode $D_1$ is lighted during the time between the commencement of the fading operation and the completion thereof.

In operation, when the switch $S_2$ is closed for effecting the fading-out during the normal operation of the camera for the proper exposure, the capacitor C is charged by the divided voltage given by the resistor $R_7$ thereby raising the voltage at b higher than the voltage at a. Thus, the transistor $T_1$ is rendered to be conductive to raise the voltage correspondingly to the voltage at b so that the diaphragm is stopped down by the actuation of the meter M to commence the fading-out, while the transistor $T_2$ is rendered to be conductive to light the light emitting diode $D_1$ to indicate the commencement and continuation of the fading-out.

During the time the voltage at b of the capacitor C is being raised to the divided voltage of the resistor $R_7$, and the voltage at a is also raised following the rise of the voltage at b thereby completing the fading-out by the actuation of the meter which drives the diaphragm so as to be stopped down, when the voltage at b is raised beyond the divided voltage at E given by the voltage dividing resistors $R_8$, $R_9$, the transistor $T_3$ is rendered to be conductive, assuming that the base-emitter voltage $V_{BE}$ of the transistor $T_3$ is negligible, and the transistor $T_4$ is turned to be conductive. As a result, the transistor $T_2$ is rendered to be non-conductive to extinguish the light emitting diode $D_1$ to indicate the completion of the fading-out.

The time period between the completion of the fading-out and the commencement of the fading-in is indicated by the fact that the light emitting diode $D_1$ is extinguished after the same has been lighted to indicate the completion of the fading-out and the denergized state of the light emitting diode $D_1$ continues until the fading-in is commenced at which time the light emitting diode $D_1$ is again lighted to indicate the commencement of the fading-in and the lighted state continues until the fading-in is completed at which time the light emitting diode $D_1$ is again extinguished to indicate the completion of the fading-in as described below.

When the switch $S_2$ is opened to effect the fading-in, the electric charge stored in the capacitor C is discharged through the resistor $R_7$ to lower the voltage at b, and hence, to lower the voltage at a thereby commencing the fading-in, and, when the voltage at b is lowered below the divided voltage at E, the transistor $T_3$ is rendered to be non-conductive and the transistor $T_4$ is also turned to be non-conductive while the transistor $T_2$ is rendered to be conductive to light the light emitting diode $D_1$ and held at the lighting state thereby indicating the commencement and the continuation of the fading-in. When the voltage at b is lowered below the voltage at a given by the voltage dividing resistor $R_3$, the fading-in is completed at which time the transistor $T_1$ is rendered to be non-conductive and the transistor $T_2$ is also turned to be non-conductive to extinguish the light emitting diode $D_1$ thereby indicating the completion of the fading-in.

Figure 5:
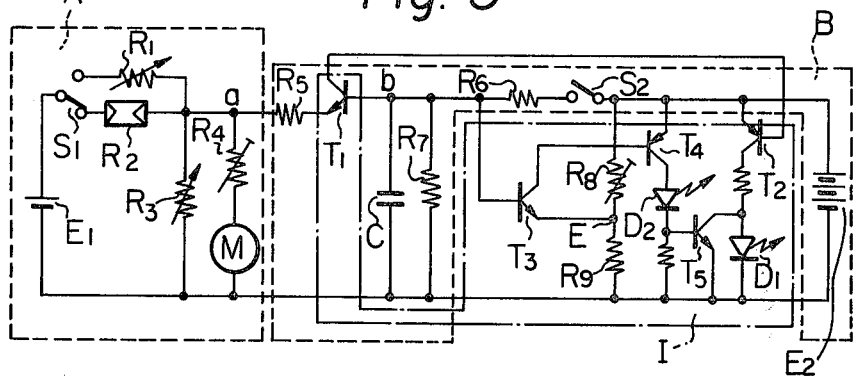

FIG. 5 shows a modification of the circuit of FIG. 4 wherein a transistor $T_5$ and a light emitting diode $D_2$ are added to the fading indicating circuit I between the transistor $T_4$ and the light emitting diode $D_1$ so that the time of fading-out is indicated by the illumination of the light emitting diode $D_1$, and the completion of the fading-out is indicated by the extinguishing of the diode $D_1$ and the illumination of the diode $D_2$, while the time period between the completion of the fading-out and the commencement of the fading-in is indicated by the illumination of the diode $D_2$, the commencement of the fading-in being indicated by the illumination of the diode $D_1$ and the extinguishing of the diode $D_2$, while the completion of the fading-out is indicated by the extinguishing of the light emitting diode $D_1$.

More particularly, when the switch $S_2$ is closed so as to effect the fading out, the voltage at b rises beyond the voltage at a to turn the transistor $T_1$ to be conductive and the transistor $T_2$ to be conductive thereby lighting the light emitting diode $D_1$ to indicate the fading-out. When the voltage of the capacitor C reaches the divided voltage of the resistor $R_7$ to terminate the fading-out and the voltage at b rises beyond the voltage at E, the transistor $T_3$ and, hence, the transistor $T_3$ are rendered to be conductive so that the transistor $T_4$ is turned to be conductive to light the light emitting diode $D_2$ while the transistor $T_5$ is rendered to be conductive to short-circuit the diode $D_1$ thereby extinguishing the diode $D_1$ to indicate the completion of the fading-out. The lighting of the diode $D_2$ indicates the faded-out condition.

When the switch $S_2$ is opened for the fading-in, the capacitor C is discharged through the resistor $R_7$ to lower the voltage at b and, hence, the voltage at a thereby effecting the fading-in by the actuation of the meter M, and, when the voltage at b becomes lower than the voltage at E, the transistor $T_3$ and, hence, the transistor $T_4$ are rendered to be non-conductive so that the diode $D_2$ is extinguished while the transistor $T_5$ is rendered to be non-conductive to light the diode $D_1$ thereby indicating the fading-in.

When the voltage at b is lowered below the divided voltage at a given by the resistor $R_3$, the transistor $T_1$ and, hence, the transistor $T_2$ are rendered to be non-conductive to extinguish the diode $D_1$ thereby indicating the completion of the fading-in.

Figure 6:
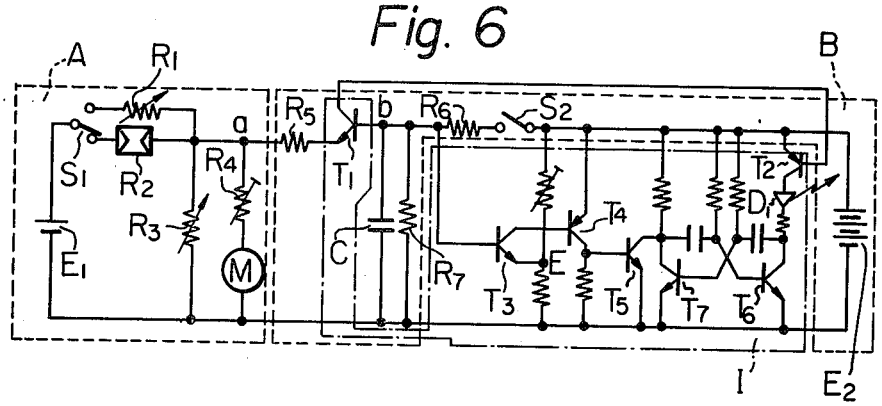

FIG. 6 shows another embodiment of the present invention, wherein a non-stable multivibrator including a light emitting diode $D_1$ and transistors $T_6$, $T_7$ is provided so that the fading operation is indicated by the repeated lighting and extinguishing of the diode $D_1$ through the transistors $T_2$, $T_3$, $T_4$ and $T_5$ while the time period during the completion of the fading-out and the commencement of the fading-in is indicated by the continuous lighting of the diode $D_1$.

In operation, when the switch $S_2$ is closed for the fading-out, the voltage at b, and, hence, the voltage at a are raised to commence the fading-out and to render the transistors $T_1$ and $T_2$ to be conductive. During the time the voltage at b does not yet reach the voltage at E, the transistors $T_3$, $T_4$ and $T_5$ are held non-conductive and the transistor $T_2$ is conductive, and, therefore, the diode $D_1$ is repeatedly lighted and extinguished by the active state of the non-stable multivibrator so as to indicate the fading-out. When the voltage at b reaches the voltage at E to complete the fading-out and further rises beyond the voltage at E, the transistors $T_3$, $T_4$ and $T_5$ are rendered to be conductive to shortcircuit the transistor $T_7$ so that it is rendered to be non-conductive while the transistor $T_6$ is held conductive to continuously light the diode $D_1$ thereby indicating the completion and the continuation of fading-out.

When the switch $S_2$ is opened for the fading-in, the voltage at b and, hence, the voltage at a are lowered to commence the fading-in. When the voltage at b is lowered below the voltage at E, the transistors $T_3$, $T_4$ and $T_5$ are rendered to be non-conductive so that the diode $D_1$ is repeatedly lighted and extinguished by the active state of the non-stable multivibrator to indicate the fading-in. When the voltage at b is lowered below the divided voltage at a given by the resistor $R_3$, the fading-in is completed and the transistor $T_1$ and, hence, the transistor $T_2$ are rendered to be non-conductive to extinguish the diode $D_1$ thereby indicating the completion of the fading-in.

Figure 7:
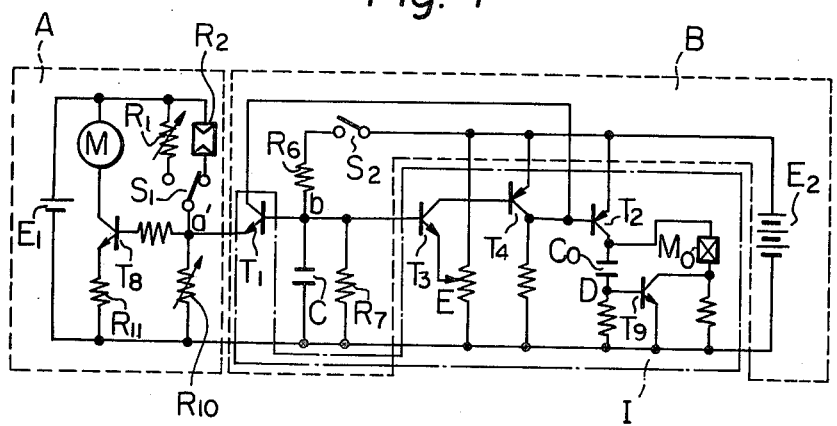
Figure 8:
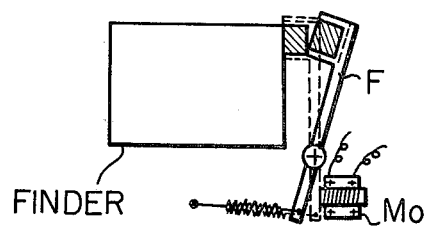
FIG. 8 is a fragmentary view showing the flag member of the fading indicating device of the present invention.

FIGS. 7 and 8 show a modified embodiment of the present invention wherein a flag member or the optical image thereof is moved into or removed from the field of view of the finder of the camera depending upon the conditions of the fading operation so as to indicate the fading operation.

In FIG. 7, the fading indicating circuit I includes an electromagnet $M_o$, a capacitor $C_o$ and a transistor $T_9$ in place of the diode $D_1$ in FIG. 4.

The electromagnet $M_o$ cooperates with a flag member F swingably supported adjacent to the finder and biased by a spring so that the flag member F is normally held apart from the field of view of the finder. However, when the electromagnet $M_o$ is energized, the flag member F is actuated by the electromagnet $M_o$ against the action of the spring so as to move the flag member F into the field of view of the finder.

Instead of directly moving the flag member F into the field of view of the finder, the optical image of the flag member can be moved into the field of view of the finder.

In the diaphragm control circuit A, the divided voltage at a' given by the voltage dividing circuit consisting of the resistor $R_1$ or the photoelectric element $R_2$ and the resistor $R_{10}$ is applied to the base of the transistor $T_8$, the emitter of which is connected to a resistor $R_{11}$, while the collector of the transistor $T_8$ is connected to the meter M.

In the normal operation of the camera for the proper exposure, the collector-emitter current of the transistor $T_8$ varies correspondingly to the divided voltage at a' thereby actuating the meter M to drive the diaphragm for the proper exposure or the controlled diaphragm aperture.

When the switch $S_2$ is closed for the fading-out, the capacitor C is charged to raise the voltage at b beyond the voltage at a' so that the meter M is actuated to commence the fading-out and to rendered the transistor $T_1$ and, hence, the transistor $T_2$ to be conductive thereby generating a differential pulse at the point D to turn the transistor $T_9$ to be conductive for a short time period so that the electromagnet $M_o$ is energized by a large current to move the flag member F into the field of view of the finder against the action of the spring to indicate the fading-out. After the flag member F is attracted by the electromagnet $M_o$, the transistor $T_9$ is turned to be non-conductive, and the electromagnet $M_o$ is held energized by a small current flowing through the transistor $T_2$ which is held conductive to continue the indication of the fading-out by the flag member F.

When the voltage at b reaches the voltage at E to complete the fading-out and further rises beyond that voltage, the transistors $T_3$, $T_4$ are rendered to be conductive and the transistor $T_2$ is turned to be non-conductive to deenergize the electromagnet $M_o$ so that the flag member F is withdrawn from the finder by the action of the spring to indicate the completion of the fading-out.

The fading-in is effected by opening the switch $S_2$. Thus, the voltage at b is lowered and the voltage at a' is lowered to commence the fading-in while the transistors $T_3$, $T_4$ are made non-conductive and transistor $T_2$ is made conductive when the voltage at a' is lowered below the divided voltage at E, so that the transistor $T_9$ is rendered to be conductive for a short time period by the capacitor $C_o$ to energize the electromagnet $M_o$ by a large current so as to move the flag member F into the field of view of the finder to indicate the fading-in, thereafter, the electromagnet $M_o$ is held energized by a small current by the transistor $T_2$. When the voltage at b is lowered below the divided voltage at a' to complete the fading-in, the transistors $T_1$, $T_2$ are rendered to be non-conductive and the electromagnet $M_o$ is deenergized to withdraw the flag member F from the finder to indicate the completion of the fading-in.

The present invention can indicate the conditions of the advance of the fading operation in various manners thereby insuring correct manipulation of the camera by the operator.

We claim:

1. Device for indicating fading operation in a cine-camera comprising:

a diaphragm control circuit for generating a controlled voltage such as a scene light indicating voltage indicative of the scene brightness and an adjusted voltage by means of a manually adjustable resistor, diaphragm driving means receiving the controlled voltage so as to actuate the diaphragm driving means for setting the diaphragm of the camera to an aperture determined by the controlled voltage, a capacitor-resistor circuit connected to the diaphragm control circuit for selectively applying to the diaphragm control circuit a constant voltage for the charging thereof and removing from the diaphragm control circuit the constant voltage for the discharging thereof so that the diaphragm is continuously actuated with the lapse of time to effect the fading-in and fading-out, a first comparator connected to the outputs of the capacitor-resistor circuit and the diaphragm control circuit so as to receive both the output voltages thereof for comparing the same with each other thereby issuing a signal when both the output voltages are made equal to each other, a faded-out voltage generating circuit for sensing a predetermined voltage of the capacitor-resistor circuit by which the fading-out is completed so as to issue the predetermined voltage, a second comparator connected to the outputs of the capacitor-resistor circuit and the faded-out voltage generating circuit so as to receive the output voltages thereof to compare the same with each other thereby issuing a signal when the output voltage of the capacitor-resistor circuit reaches the predetermined voltage for the completion of the fading-out, and indicating means connected to the outputs of the first and the second comparator so as to receive the output signals thereof for indicating the conditions of at least the completion of the fading-out and the completion of the fading-in.

2. Device according to claim 1, further comprising an indicating means control circuit connected to the outputs of the first and the second comparator so as to receive the output signals thereof for permitting the indicating means to indicate the time required for the fading-out and the fading-in.

3. Device according to claim 1, wherein the indicating means includes transistor means and a light emitting diode actuated by the transistor means so as to indicate the fading operation by the lighting of the diode.

4. Device according to claim 2, wherein the indicating means includes transistor means and a first and a second light emitting diode actuated by the transistor means so that the fading-out is indicated by the lighting of the first diode and the completion of the fading-out is indicated by the extinguishing of the first diode and the lighting of the second diode, the fading-out condition being indicated by the lighting of the second diode, the fading-in being indicated by the lighting of the first diode and extinguishing of the second diode, while the completion of the fading-in is indicated by the extinguishing of the first diode.

5. Device according to claim 2, wherein the fading indicating circuit includes a non-stable multivibrator and a light emitting diode actuated by the non-stable multivibrator so that the fading-out as well as the fading-in is indicated by the repeated lighting and extinguishing of the diode while the faded-out condition is indicated by continued lighting of the diode.

6. Device according to claim 1, wherein the fading indicating circuit includes an electromagnet, a capacitor and transistor means for energizing the electromagnet, the fading indicating circuit further including a flag member actuated by the electromagnet so that the fading-out and the fading-in are indicated by the movement of the flag member into the field of view of the finder of the camera.

* * * * *